Figure 1:
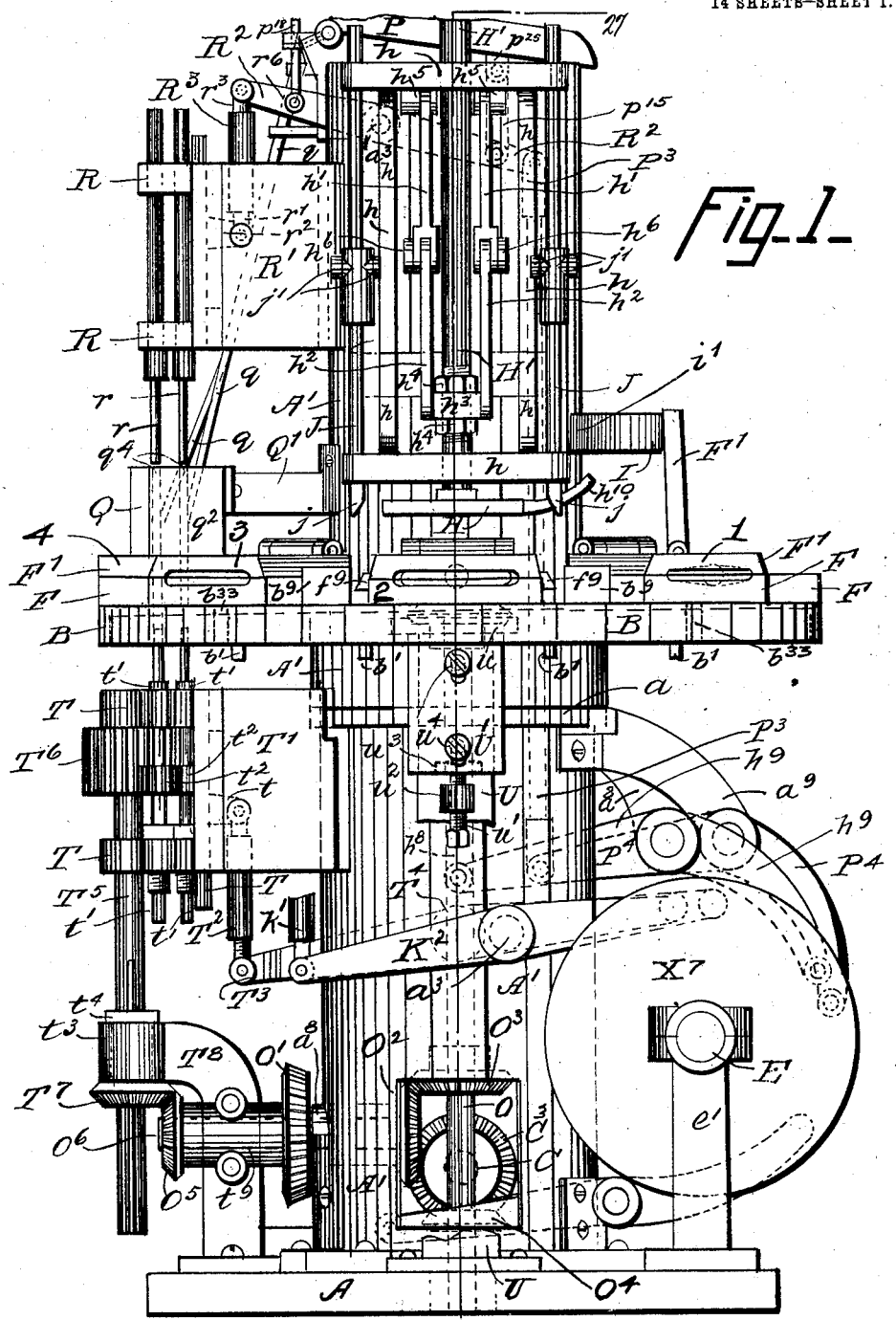

G. W. MANNING.
BROOM MAKING MACHINE.
APPLICATION FILED MAR. 27, 1911.

1,053,192.

Patented Feb. 18, 1913.
14 SHEETS—SHEET 9.

Fig-9.

Witnesses:
John C Grotzinger
Arthur M Willard

By his Attorney

Inventor
George W. Manning
Geo. W. Levin

G. W. MANNING.
BROOM MAKING MACHINE.
APPLICATION FILED MAR. 27, 1911.
1,053,192.
Patented Feb. 18, 1913.
14 SHEETS—SHEET 10.
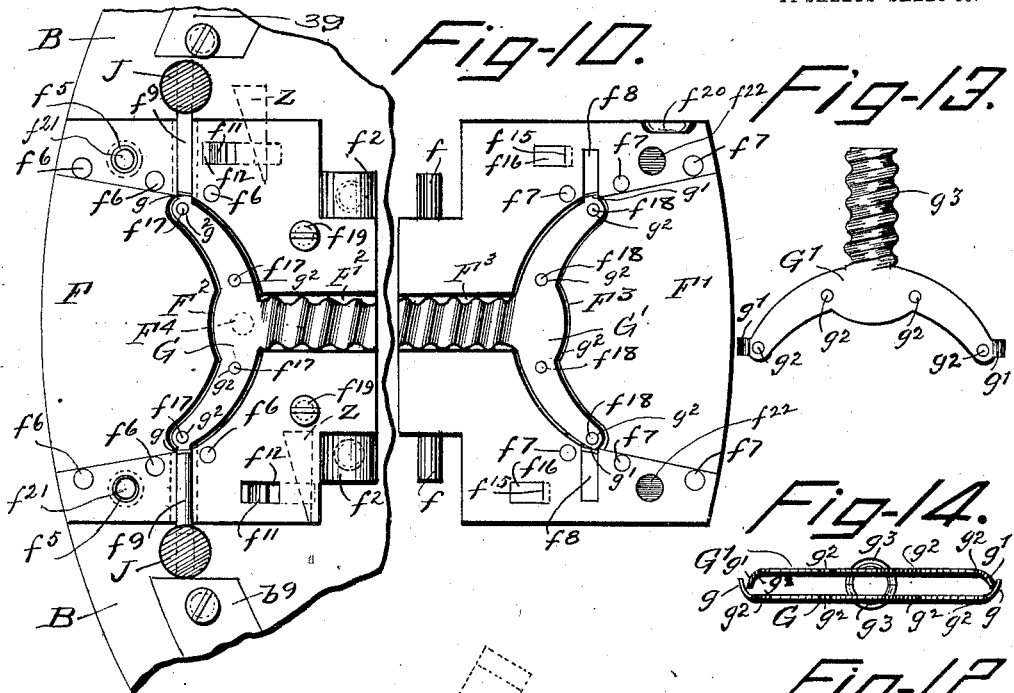
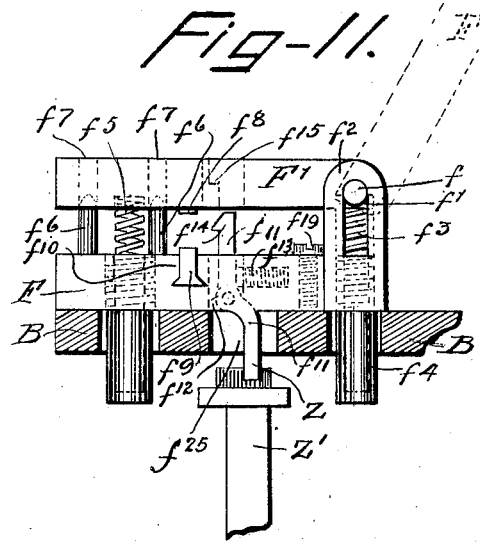
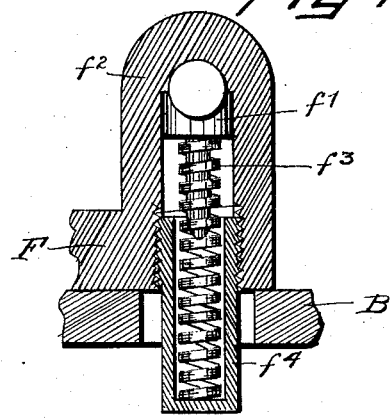
Witnesses:
John C. Grotzinger
Arthur M. Willard
By his Attorney
Inventor
George W. Manning
Geo. W. Levin

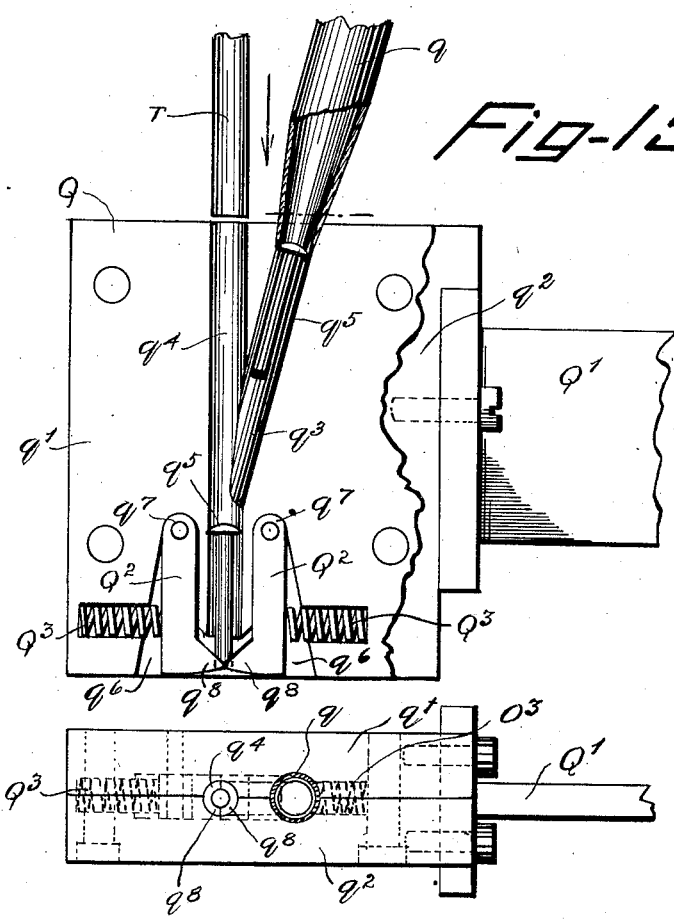

G. W. MANNING.
BROOM MAKING MACHINE.
APPLICATION FILED MAR. 27, 1911.
1,053,192.
Patented Feb. 18, 1913.
14 SHEETS—SHEET 12.
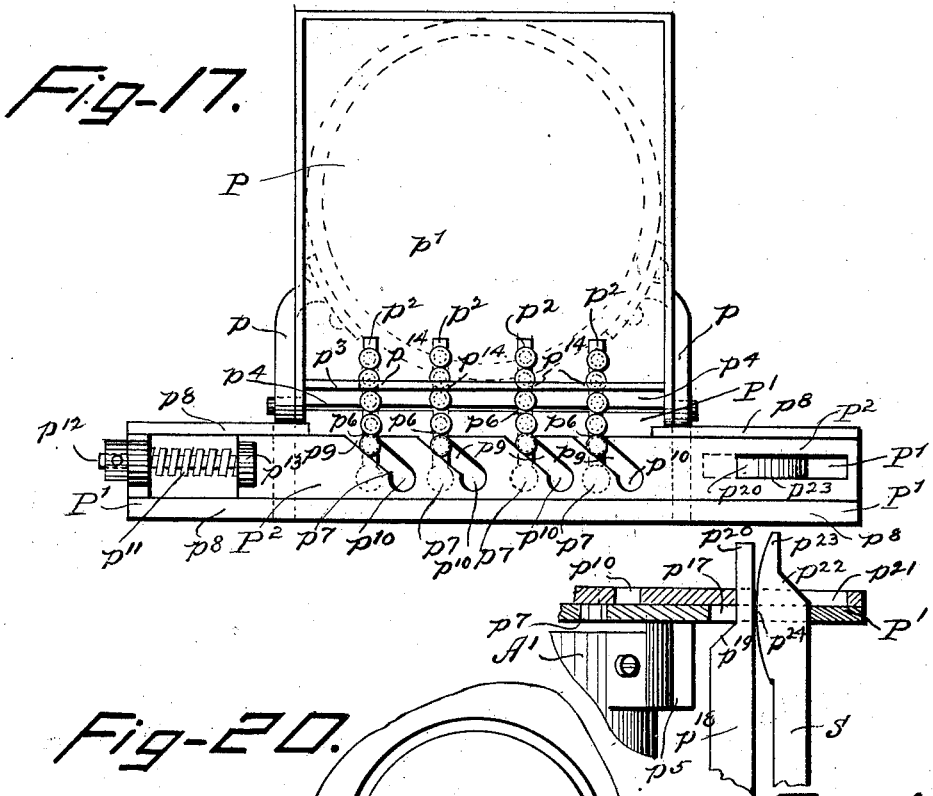
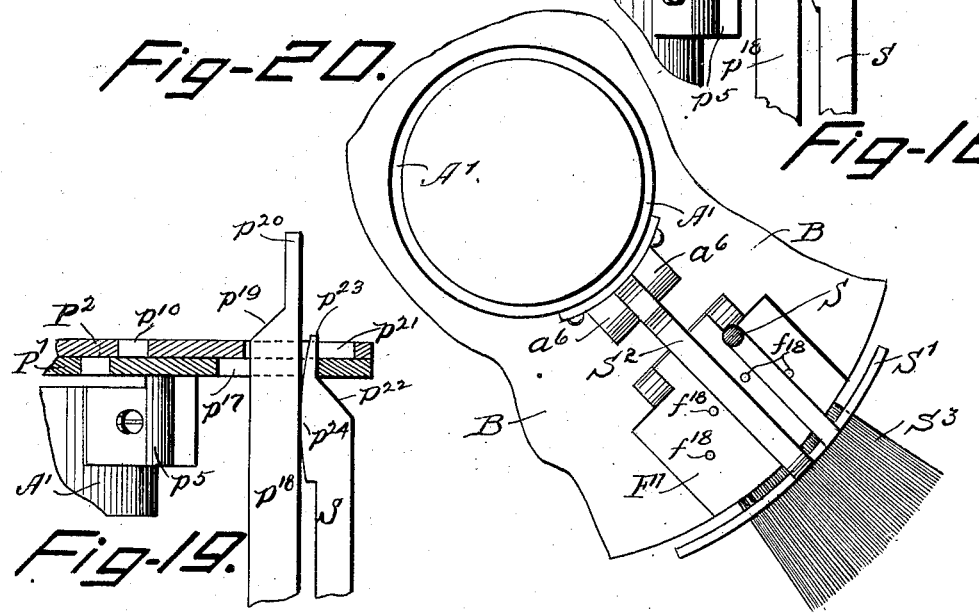

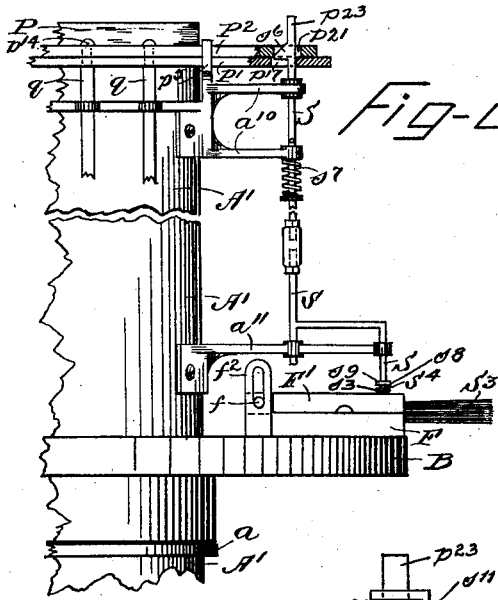

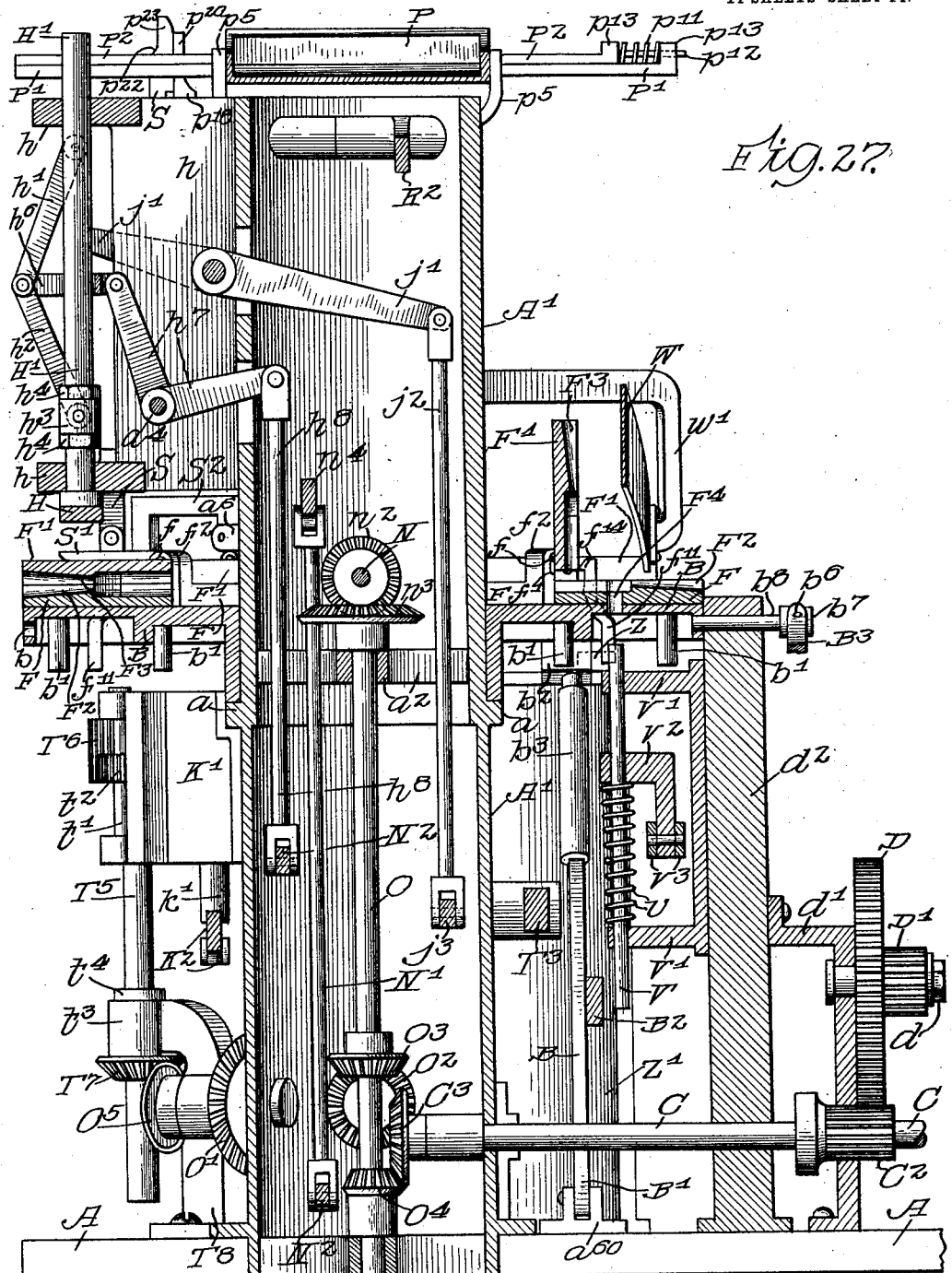

UNITED STATES PATENT OFFICE.

GEORGE W. MANNING, OF CHICAGO, ILLINOIS.

BROOM-MAKING MACHINE.

1,053,192.  Specification of Letters Patent.  Patented Feb. 18, 1913.

Application filed March 27, 1911. Serial No. 617,152.

*To all whom it may concern:*

Be it known that I, GEORGE W. MANNING, a citizen of the United States, residing at Chicago, in the county of Cook and State of Illinois, have invented certain new and useful Improvements in Broom-Making Machines, of which the following is a full description, reference being had to the accompanying drawings, and to the letters of reference and numerals marked thereon, which form part of this specification.

My invention, as illustrated herewith, relates particularly to improvements in machines for making brooms of straw or the like, in which the broom-head is formed through the employment of metallic reinforcing-plates which, during the process of construction are caused to fixedly embrace the broom-strands and likewise integrally form means for receiving the broom handle, but the same is intended to be applicable to the general broom making industry, in so far as its various features of construction and operation may obtain.

The prime object of the invention is to provide apparatus adapted to produce brooms of approved design and perfect construction with such expedition and economy of cost as will permit the supplying of the same to the public at figures materially reduced from the ordinary market prices: and to such end, the invention embraces in general terms, a series of novel devices arranged and adapted, in successive order, to automatically perform distinctive mechanical functions necessary to the manufacture of a broom, the machine illustrated herewith being of rotary type designed to produce at each full revolution or cycle of the table a multiplicity of brooms completely finished and in merchantable condition, except as to the sewing and trimming of the broom-strands; devices for effecting such work,—for the convenience of machine construction and operation, not being embraced in the apparatus.

Broadly stated the main feature of my invention consists in mounting upon a rotatable table, provided with means for intermittently rotating and stopping the same, a plurality of chucks adapted each to receive broom head forming plates and a bundle of broom straws and after being so provided with the plates and broom straws to be carried around by the movement of the table in succession to devices which respectively automatically act to close and lock the chucks; to drill holes for the suitable reception of rivets; to insert and set rivets in place; to unlock the chucks; to open the chucks; and to discharge the broom-head therefrom. During these operations the only manual service required is to place the broom forming plates and bundles of broom straws successively into the chucks as they are moved around in proper position for doing so by the movement of the table.

Special features of construction and operative arrangement are also embraced in the invention, all of which are comprehensively shown in the drawings and hereinafter fully described and specified in the appended claims.

Figure 2:
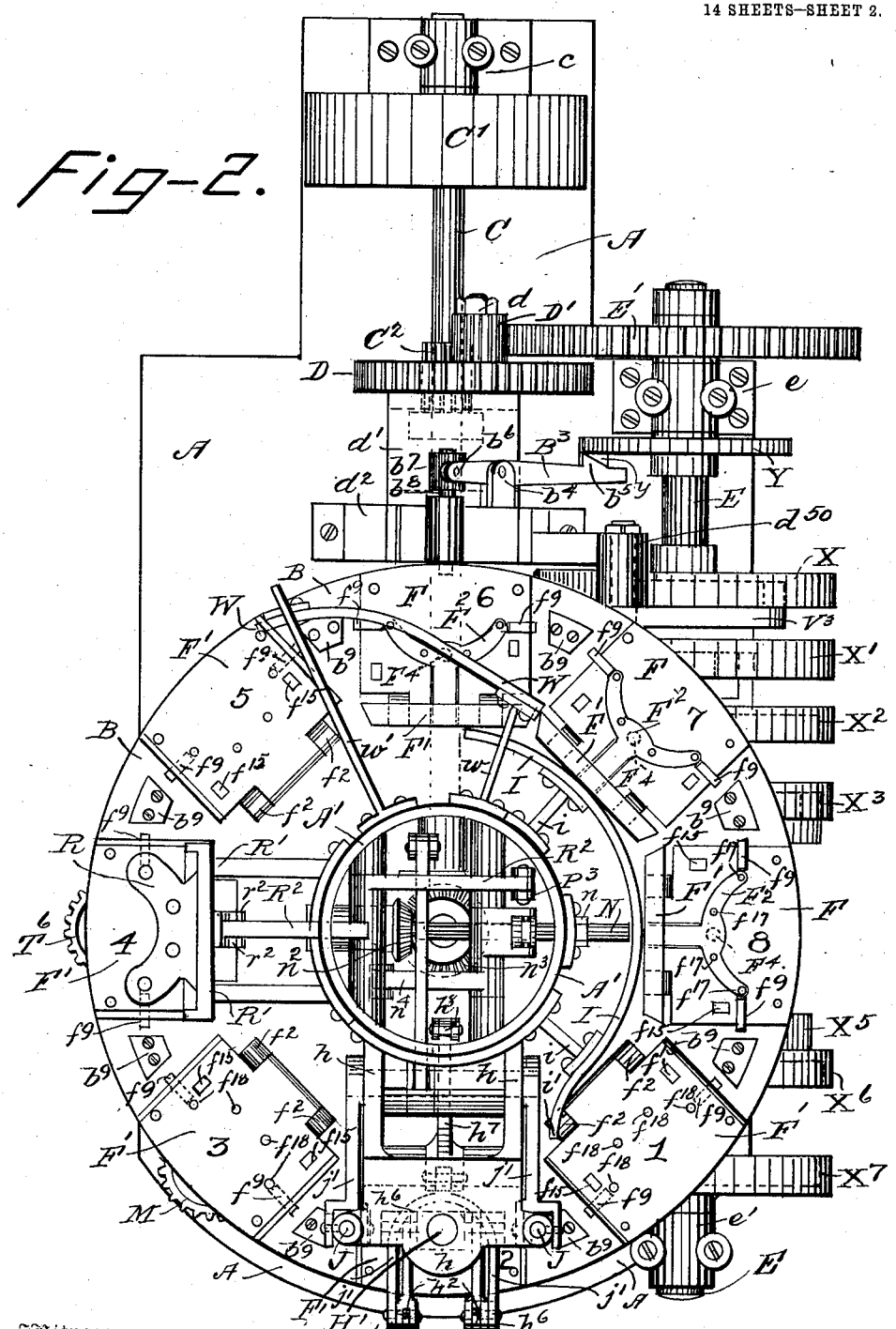
Figure 3:
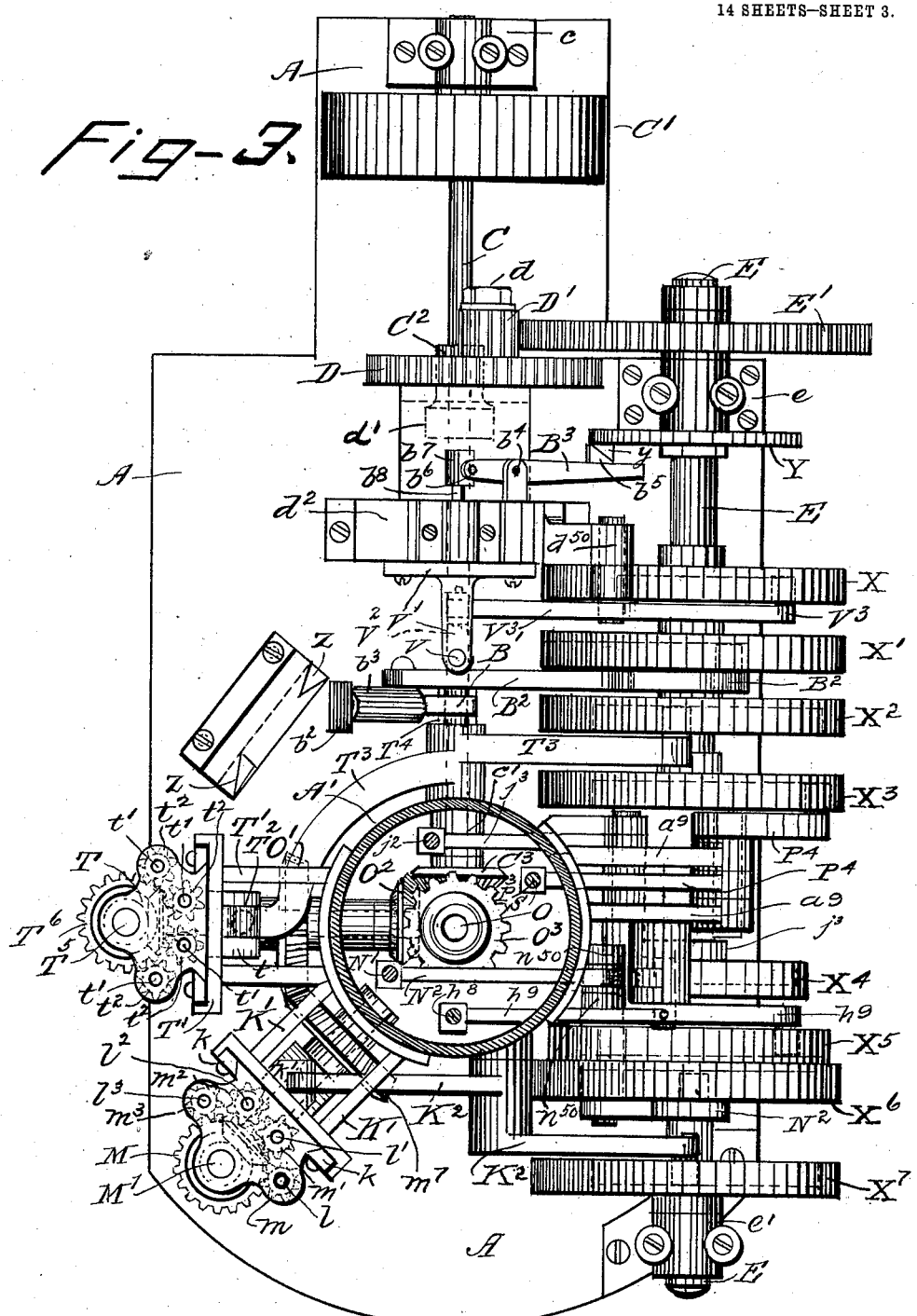
Figure 4:
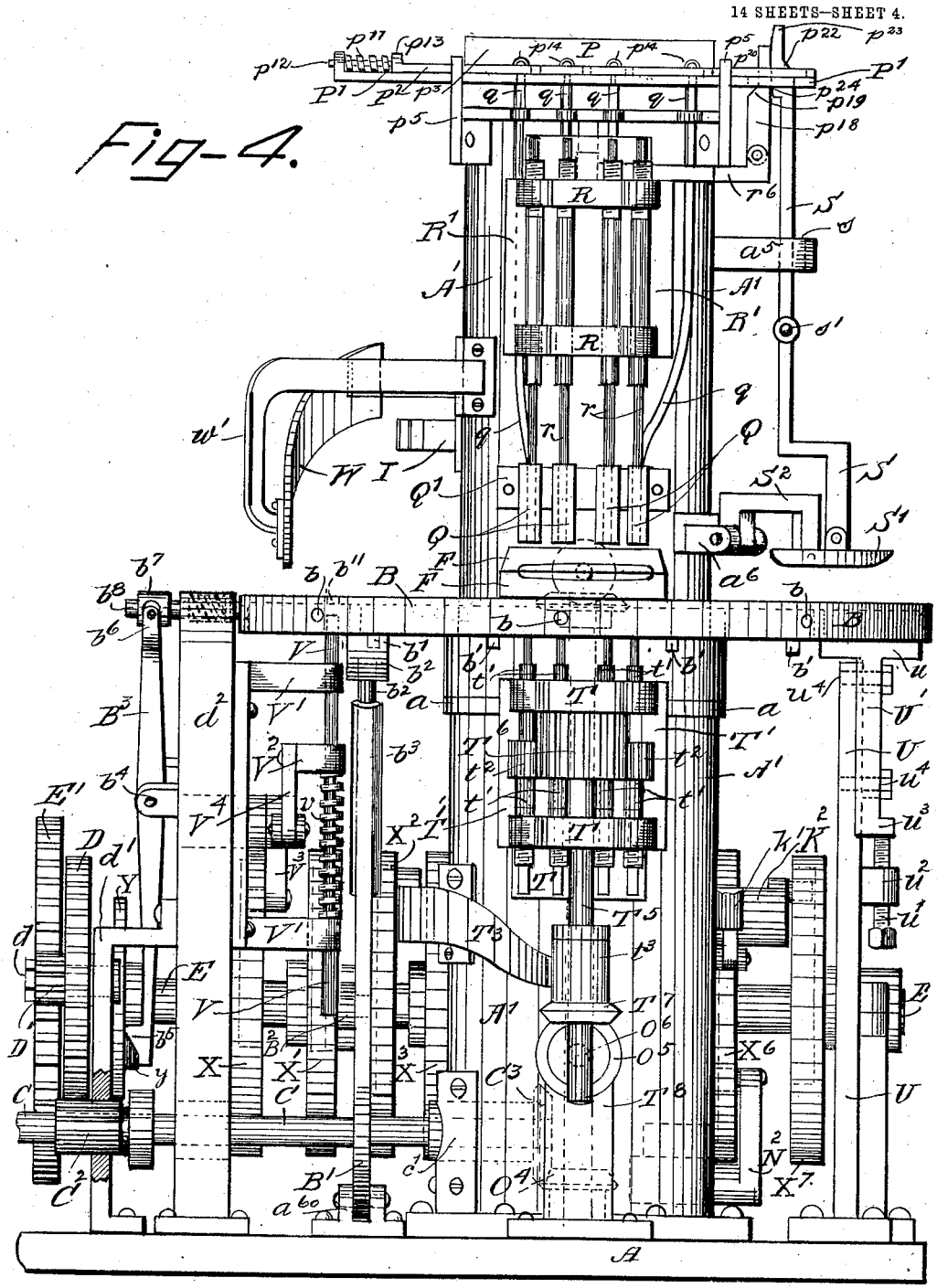
Figure 5:
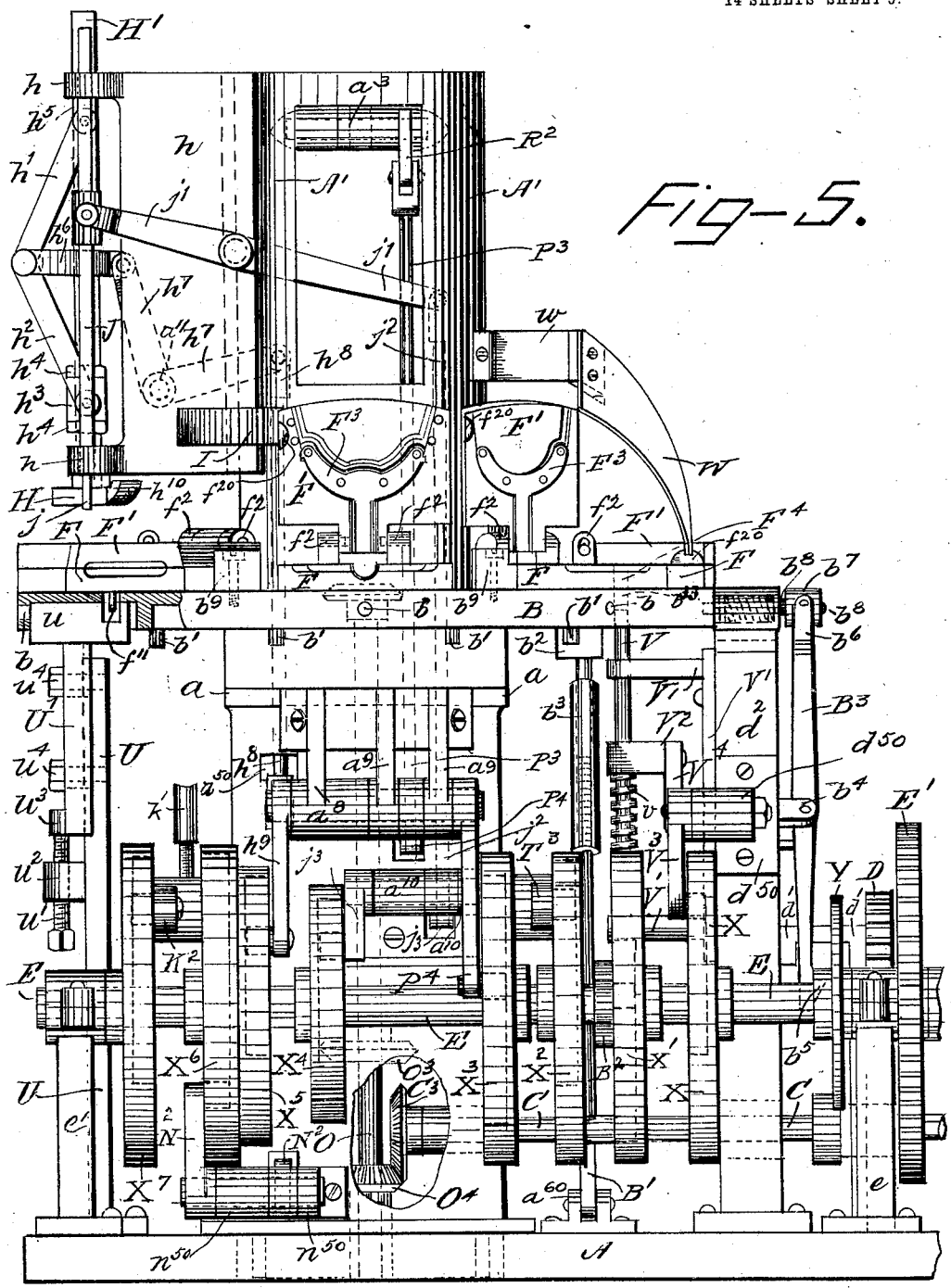
Figure 6:
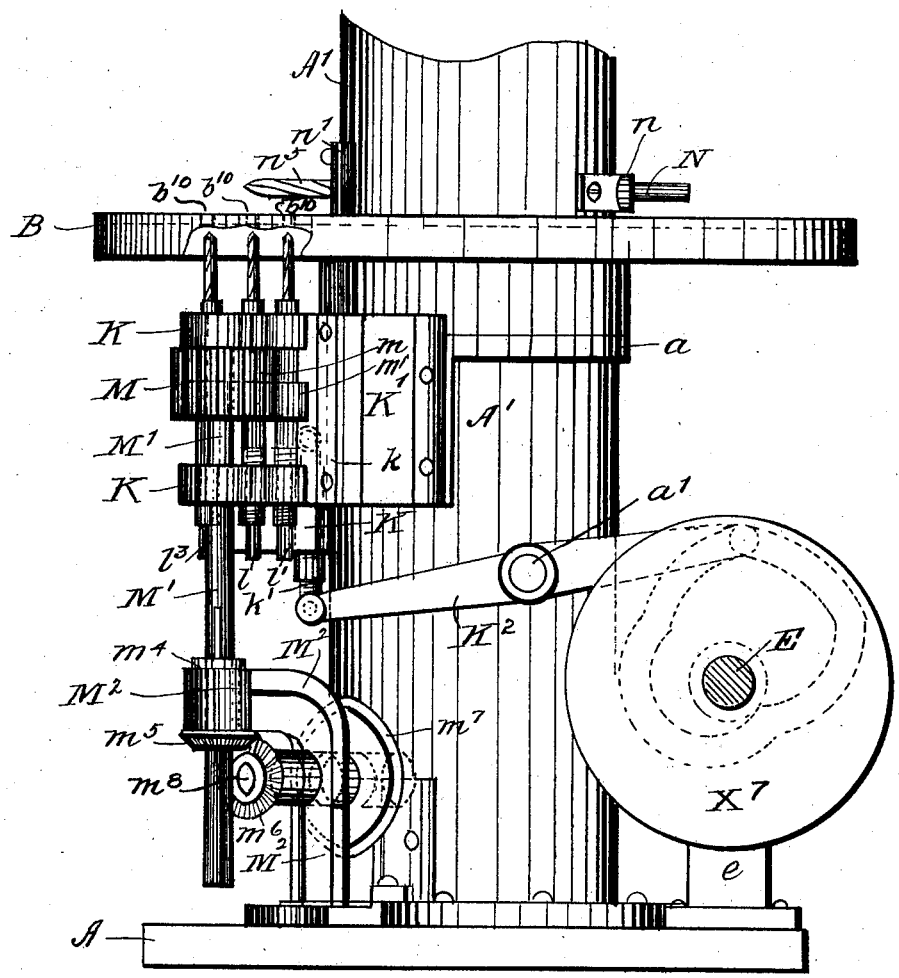
Figure 7:
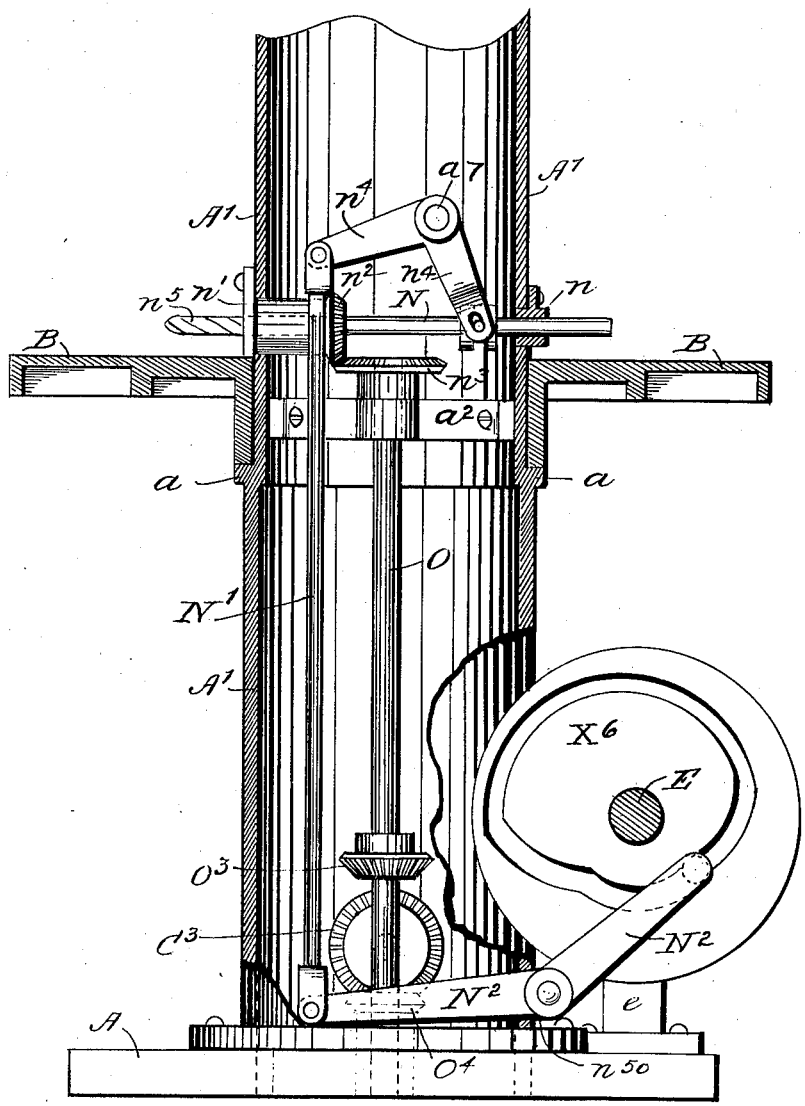
Figure 8:
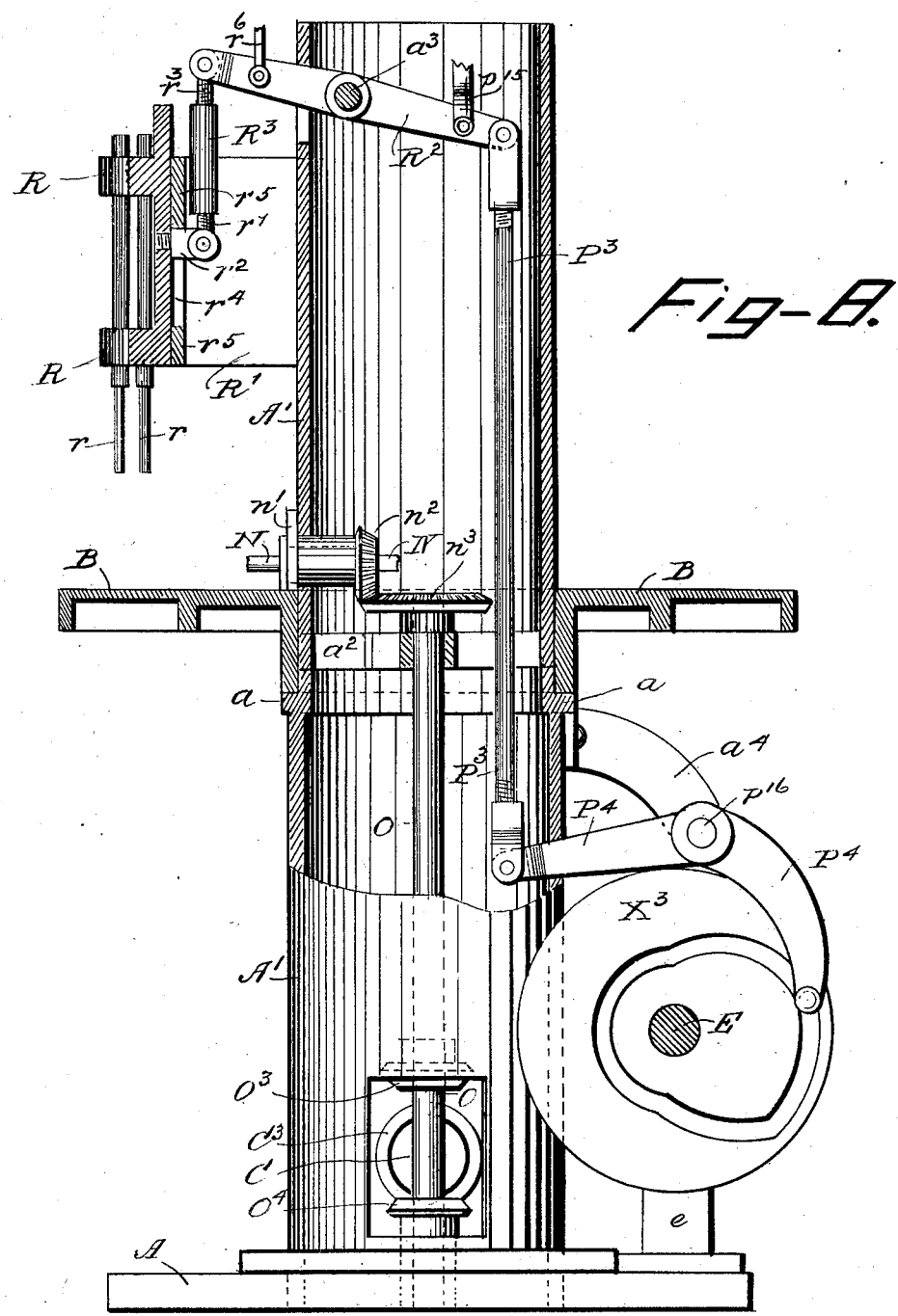

In the accompanying drawings:—Figure 1, is an end-elevation of the machine, looking in from a point in front of the location of the devices which operate to force the chuck-members together for locking engagement. For purposes of clearness of illustration, the drill-carrying sliding-head and certain other of the devices embraced in the construction, are removed from the view. Fig. 2, is a top-plan view, with the rivet-carrying, feeding and operating, and certain of the other devices removed. Fig. 3, is a top-plan view, taken from a point beneath and contiguous to the position of the rotary table; the cylindrical column being shown in horizontal section. Fig. 4, is a side-elevation, particularly intended to show the table operating, the rivet-holding, feed controlling, discharging, guiding, placing, and setting devices; together with the means employed for discharging the completed broom from the machine. Fig. 5, is also a side-elevation, in reverse of Fig. 4, more fully illustrating the devices therein shown, and the devices employed for closing the chuck; also showing the means employed for upsetting or bending the toes of the broom head-forming, metallic plate; the operative arrangement of the adjustable column provided to take and offset the thrust of the chuck closing devices, and the devices for lifting and closing the upper member of the respective chucks at certain stages in the operation of the machine. Fig. 6, is a detail in elevation intended to show the drilling-devices which provide the way for rivet-insertion through the broom-strands and the head-forming plates; and the means for reciprocating the drill head and actuating the drills. Fig. 7, is a view, mainly in vertical section showing the devices for boring out from the handle receiving shank of the head-forming plates broom straws that may have collected therein so as to leave the opening cleared, and showing also the means employed for operating the same. Fig. 8, is likewise a view, mainly in vertical section, particularly intended to show the reciprocating head which carries the rivet-driving plungers and the devices which give motion to same. Fig. 9, is an elevation, in part broken away, looking from the driving end of the machine (in reverse to Fig. 7), more fully illustrating the devices which give intermittent motion to, and check and hold the table in position respectively; and the devices employed for lifting the upper chuck member, from its closed position. Fig. 10, shows top and bottom plan views of the lower and upper chuck-members which receive the broomhead-forming plates and the broom-strands, and the several devices connected, and coöperating therewith. Fig. 11, is a detail further showing the construction and operative arrangement of said chuck-members, together with their locking, releasing and other adjunct devices. Fig. 12, is an enlarged sectional detail of the inner end of the lower chuck-member, more fully showing the spring sustained bearing which pivotally carries the upper chuck-member. Fig. 13, is a top plan of the upper section of the broom-head forming-plates. Fig. 14, is an end view of the lower and upper sections of said plates, as they would appear just preliminary to being bent or fixed in position over the broom-strands. Fig. 15, is a broken detail, in elevation showing the devices employed for guiding, controlling the final delivery, and driving the rivets to their position in the broom construction. Fig. 16, is a top plan of the details illustrated in the said Fig. 15. Fig. 17, is a top plan detail of the rivet-carrying hopper and devices coöperating therewith which control the discharge of the rivets therefrom. Fig. 18, is a broken detail showing the means employed for actuating the rivet-discharge controlling devices. Fig. 19, is a broken detail, similar to Fig. 18, except in that the discharge-control actuating devices are shown in a different working position. Fig. 20, is a top plan detail showing the devices employed for automatically controlling the discharge of rivets from the hopper. Figs. 21, 22, 23, 24, 25 and 26 are details, illustrating in modified form, devices for automatically controlling the rivet-discharge to the delivery chutes. Fig. 27 is a vertical section on line 27—27 of Fig. 1.

Similar letters and numerals of reference, indicate like parts in the several views.

The main frame work of the machine sustaining the various working parts consists of a base-plate A and a cylindrical column $A^1$ fixed thereto.

B indicates a rotary table carried axially by the column $A^1$ having for its working bearing a supporting annular projection $a$ desirably formed integral with said column.

C is the main shaft working in bearings $c$ $c^1$ carrying a driving pulley $C^1$, and pinion $C^2$; the latter meshing with a driving gear D having a stud bearing $d$ carried by the bracket $d^1$ fixed to the standard $d^2$. A pinion $D^1$ projecting from the gear D engages with a gear $E^1$ fixed to a shaft E (hereinafter referred to as "cam-shaft"), which is sustained in bearings $e$ $e^1$, and carries cam-disks X $X^1$ $X^2$ $X^3$ $X^4$ $X^5$ $X^6$ $X^7$ and Y; the latter controlling the operation of the devices which hold the table B in certain of its positions hereinafter described. The table is provided, at suitable equidistant points in its periphery, with index depressions or openings $b$ and on its under face with lugs or projections $b^1$ similarly spaced. A lever $B^1$, operative to carry the table forward through successive or step by step movements (see particularly Figs. 3, 4, 5, and 9) is pivoted by its lower end to bearing $a^{00}$ fixed to the base-plate A and operatively connected, by means of an arm $B^2$, with the slotted cam-disk $X^1$; the upper end of said lever $B^1$, being provided with a longitudinally yielding pawl $b^2$ held in normal position for engagement with the projections $b^1$ by means of a resistance spring carried within a sleeve $b^3$ forming part of said lever. A lever $B^3$, fulcrumed in bearing $b^4$ fixed to or forming part of the standard $d^2$, carries at its lower end a cam projection $b^5$ arranged to be engaged by a like projection $y$ provided on the face of the disk Y; the upper end $b^6$ of said lever being yoke-shaped and provided with a swiveled bearing $b^7$ carrying a spring bolt $b^8$ adapted to engage with the index openings or depressions $b$, formed in the periphery of the table B.

The rotary table carries on its upper face (see particularly Figs. 2, 10 and 11) a multiplicity of broom-strand receiving chucks, consisting each of lower and upper members F, $F^1$; the lower member being fixed to said table, with the upper member held in vertically-movable and swinging connection to the lower member by means of trunnions $f$ forming part of said upper member; which journal in saddle bearings $f^1$ working in cross-head projections $f^2$ formed integral with said lower member at its inner end. The bearings $f^1$ having a yielding to and fro movement, are normally held at the upper limit of their play within the cross-heads, each by means of a coil-spring $f^3$ which is held and regulated as to suitable operative resistance by means of a thimble $f^4$ having screw-threaded connection with the member F, as shown. The lower member F is also provided at each side, near its outer end, with equalizing resistance-springs $f^5$, upon which the upper member impinges when in closing or closed position, as shown in Fig. 11; said springs acting in conjunction with the springs $f^3$ to hold the upper member in such position through its closing and opening movements that the openings $f^7$ provided in the upper member are caused to properly register with guide-pins $f^6$ projecting upwardly from the lower member,—said pins likewise forming means for holding the broom-strands as against undue lateral spreading, when subjected to pressure, through the closing operation of the chuck. The said lower and upper members are also provided in their faces with recesses or grooved seats $F^2$ and $F^3$, respectively, corresponding in form with and adapted to receive the lower and upper sections G, $G^1$, respectively of the broom-head forming-plates, (shown particularly in Figs. 10, 13 and 14). The upper member $F^1$ carries fixed projecting blocks $f^8$, $f^8$, adapted when the two sections are brought together, (as shown in Fig. 14) to hold toes $g^1$ forming part of section $G^1$ from spreading outwardly under pressure while sliding blocks $f^9$ $f^9$, working in guide recesses $f^{10}$ provided in the lower member F, are driven inwardly and bend toes $g$, forming part of the lower section G over said toes $g^1$.

Devices for locking the upper chuck-members to the lower members during the broom making functions of the machine and releasing the same (see Figs. 3, 10, and 11), consist of pawl-levers $f^{11}$ pivoted in openings $f^{12}$, provided in the lower member and normally held by springs $f^{13}$ to engaging position by their upper hook-shaped ends $f^{14}$, with seats $f^{15}$ formed in apertures $f^{16}$ provided in the upper member; the lower end of each lever being extended downwardly through an opening $f^{25}$ in the table to a point permitting engagement at the proper juncture in the rotation of the table, with a fixed releasing block Z, carried by a standard $Z^1$ projected upwardly from the base plate A; the said blocks being positioned respectively on radial and circumferential lines differing from each other with the levers $f^{11}$ similarly disposed, obviously in order that contact and disengagement of both levers may be simultaneously effected. The two chuck-members are provided in their grooved seats $F^2$, $F^3$, with openings $f^{17}$, $f^{18}$, respectively for rivet insertion, which register with each other when the members are in closing and closed position and with similar openings $g^2$ formed in the lower and upper sections of the forming plates G, $G^1$, corresponding openings $b^{10}$ (see Fig. 6) being provided in the table B for purposes hereinafter described.

Devices for forcing the upper member $G^1$ of each chuck through its closing movement and locking engagement with the lower member, are shown particularly in Figs. 1, 2, and 5, in which $H^1$ indicates a vertically reciprocating rod working in upper and lower guide bearings forming part of bracket $h$, carried above the table by the column $A^1$.

$h^1$ and $h^2$ indicate toggle links. The toggle link $h^1$ is connected at its upper end to a lug $h^5$ on the upper portion of the bracket and the link $h^2$ is connected at its lower end to the rod $H^1$ above the lower guide bearing by means of a block $h^3$ which is slidingly mounted on the rod $H^1$ and is adapted to be secured in desired position thereon by means of adjusting nuts $h^4$. A yoke $h^6$ hinged to the toggle links is connected with a bell-crank $h^7$, working on bearing $a^{11}$ carried by the bracket $h$; the bell-crank being in turn pivoted to a rod $h^8$ connected through crank $h^9$ with the cam-disk $X^5$. A shoe H fixed to the lower end of the rod $H^1$, having an upwardly inclined nose $h^{10}$ forms means for guiding the partly closed upper chuck-member beneath the rod for its operation thereon.

Below the table B positioned to receive and offset the downward thrust of the clutch-closing devices on the table (see Figs. 1, 4, and 5), is located a standard U fixed to the base-plate A having an endwise adjustable member $U^1$, which by its upper end $u$, is held in snug working contact with the under face of the table; adjustment of said member being effected by means of the regulating bolt $u^1$, working in a threaded bearing $u^2$, integral of the main standard and against the lug $u^3$, forming part of the member $U^1$; which is manifestly held to the main standard by bolts $u^4$, as shown.

Devices for operating the sliding blocks $f^9$, above described, in their work of bending the toes $g$ of the plate section G (see Figs. 1, 2 and 5), consist of vertically acting rods J having their lower ends $j$, suitably tapered or wedge-shaped, working through guide bearings formed by the upper and lower portions of the bracket $h$, attached to the column $A^1$; a yoked lever $j^1$ pivotally connected to said rods and to a vertical rod $j^2$, having connection with a rocking lever $j^3$, which in turn is connected with cam-disk $X^4$ from which it derives motion. Backing up blocks $b^9$ fixed to the table on either side of each chuck-member F, hold the rods J accurately to their work, through their downward motion and function of driving the sliding blocks inward.

Devices which operate to permit the introduction of rivets through the plate sections $G^1$ G, and the broom-strands held by the chuck-members (see Figs. 3 and 6) consist of drill-carrying spindles $l$, $l^1$, $l^2$ $l^3$ sustained by a reciprocating head K working in slide-bearings $k$ forming part of a bracket $K^1$ fixed to the column $A^1$ below the table B,—pinions $m$, $m^1$, $m^2$, $m^3$, being mounted on the spindles respectively, and meshing with a driving gear M, fixed to a shaft $M^1$, likewise sustained by the said reciprocating head; the lower end of said shaft having sliding connection with bevel gear $m^5$ through its elongated hub $m^4$ sustained in a bearing forming part of bracket $M^2$, fixed to the base-plate A. Motion is given to the gear $m^5$ and therefore to the pinions carried by the drill spindle through gear M, by gears $m^6$, $m^7$, fixed to a shaft $m^8$ sustained by bracket $M^2$,—gear $m^7$ being driven by gear $O^1$ carried by a shaft $O^6$, working in bearings $t^0$ of bracket $T^8$, (see Figs. 1 and 3) which likewise carries gear $O^2$, which in turn is driven by gear $O^3$, carried by the vertical shaft O which received motion through the gear $O^4$ fixed to said shaft O, driven by gear $C^3$ keyed to the main shaft C. Vertical to and fro motion is imparted to the head K by the cam-disk $X^7$ through the rocking lever $K^2$ working on bearing $a^3$ and connected to the bottom of the head K by an adjustable link $k^1$, movement of the head through its up stroke causing the driven drills to pass through the openings $b^{10}$, $f^{17}$, $f^{18}$, and $g^2$ of the table, chuck-members and plate sections, respectively, and manifestly through the chucked-bundle of broom-strands.

To clean the handle receiving shank $g^3$, formed by the riveted plate-sections, of broom-strands, a drill carrying shaft N (see particularly Fig. 7) rotatively sustained in bearings $n$, $n^1$ attached to the column $A^1$ at a point above the table, in vertical and horizontal alinement with the center of the shank, as chucks in succession are brought to and held in position for such work, carries a bevel gear $n^2$ which meshes with a similar gear $n^3$ fixed to the upper end of the shaft O sustained in bracket bearing $a^2$ fixed to and interior of the column $A^1$. Rotary motion is given to the shaft O through the gear $O^4$ fixed to its lower end—which is driven by gear $C^3$ carried by the main shaft C; the endwise forward and retracting operation of shaft N being effected through bell-crank $n^4$ which working on a bearing $a^7$ carried by the column $A^1$ is connected with said shaft and to a rod $N^1$ hinged by its lower end to a rocking-lever $N^2$ fulcrumed at $n^{50}$ and connected with and actuated by cam-disk $X^6$ carried by the shaft E.

A reciprocable head R, carrying fixed plungers $r$ (see Figs. 1, 4, and 8) sustained by a slide-bearing bracket $R^1$ held to the column $A^1$ above the table B, positioned so that the plungers, which equal in number the vertical passages $q^4$ in the guideways Q, register with said passages, is connected through an adjustable link $R^3$ (preferably in the form of a turnbuckle) by its lower end $r^1$ to a lug $r^2$ projected from the back of the sliding-head inwardly through an aperture provided in the web of the bracket and by its upper end to a rocking lever $R^2$, hereinafter described. Downward movement of the sliding-head causes the plungers $r$ to enter the passages $q^4$ and to drive the rivets $q^5$ ahead, through the feet $q^8$ of the depending check-lever $Q^2$ to and through the openings in the chuck-member $F^1$ through the openings in plate sections G, $G^1$, and obviously through the openings formed through the broom-strands heretofore described; the plungers remaining at the downward limit of their travel and holding the rivets in position until the setting operation is concluded.

Beneath the table, vertically operative in conjunction with the head R, a sliding head T working in a bracket slide-bearing $T^1$, attached to the column $A^1$, carries devices for setting the lower ends of the rivets, held as described by the plungers $r$; the same consisting (see Figs. 1, 3, and 4) of rotatively sustained spinning spindles $t^1$, which equal in number and are in vertical alinement with said plungers carrying pinions $t^2$ which mesh with and are driven by a spur gear $T^6$ fixed to a shaft $T^5$, rotatively held by the bracket and extended downwardly through the elongated hub $T^4$, of a gear $T^7$, with which it has spline connection, carried by a bracket $T^8$ fixed to the base A.

$T^2$ indicates an adjustable link which is connected with the head T and is hinged by its lower end to a lug $t$ projecting inwardly from the head, and by its upper end with a rocking lever $T^3$ fulcrumed on a bearing $T^4$ fixed interior of the column $A^1$—said lever being connected with and vibrated by the cam-disk $X^2$ carried by the shaft E. Motion is imparted to the gear $T^7$ and therefore to the gear $T^6$ and pinions $t^2$ through a gear $O^5$ carried by a shaft $O^6$ sustained in bearings $t^8$ $t^9$, gear $O^2$ carried at the inner end of said shaft $O^6$, gears $O^3$, and $O^4$ fixed to the vertical shaft O and gear $C^3$ carried by the main shaft C.

Means for holding, feeding, delivering, placing and setting the rivets which secure the head-forming plate-sections to the broom-strands shown in Figs. 1, 4, 8, 15, 16, 17, 18, and 19, consist of a hopper P, preferably of rectangular form, trunnioned in brackets $p$ fixed to the upper end of the column $A^1$ and provided in its floor $p^1$ (see particularly Fig. 17) which is outwardly projected at $p^4$ for a suitable distance beyond its front wall $p^3$, with a series of slots indicated by $p^2$ which correspond in number with the rivets intended to be employed in the construction of a broom; said slots having width suitable for the dropping through of the shank portion of a rivet while sufficiently narrow to intercept the passage of the rivet head and being extended through the projection $p^4$ to its outer margin contiguous to a plate $P^1$ fixedly held by a bracket $p^5$ attached to the column $A^1$. The plate $P^1$ is also provided with slots $p^6$ (which being of similar size and number are for operative purposes continuations of said slots $p^2$) having their outer terminations $p^7$ sufficiently enlarged to allow the dropping through of a rivet head and registering with an equal number of fixedly sustained inclined chutes $q$ which extend downwardly to connection, each, with a terminal guideway Q fixed to a bracket $Q^1$, carried by the column $A^1$. The plate $P^1$ carries on its upper face, between lateral guides $p^8$ a longitudinally movable slide-plate $P^2$ provided with slots $p^9$ of width and number corresponding with the slots $p^6$ provided in the plate $P^2$, but arranged angularly with relation thereto, with their open ends positioned and normally held over said slots $p^6$ as shown, through the agency of a resistance spring $p^{11}$, carried by an extension $p^{12}$ of the plate $P^2$ and impinging against lug $p^{13}$ forming part of the fixed plate $P^1$; the inner terminations $p^{10}$, of said slots $p^9$ being similarly enlarged and for a like purpose as the terminations $p^7$ of the slots $p^6$. The front wall $p^3$ of the hopper (see Fig. 4) is provided immediately over the slots $p^2$ with an equal number of openings $p^{14}$ of suitable contour and dimensions greater than the size of a rivet head, for allowing passage outwardly from the hopper of the rivets held and guided by the slots $p^2$.

The guideways Q, preferably composed of two sections $q^1$, $q^2$ respectively, rigidly secured together (see Figs. 15 and 16) are provided each, with a vertically inclined passway $q^3$ of like diameter with the lower end of the chute $q$ with which it registers and is connected; the lower terminal of the passway making junction with a vertical guide-passage $q^4$ arranged to receive a rivet $q^5$ and the plunger $r$ which drives the rivet to its setting position. Interior of the guideway Q at or near its lower end, is provided a suitable recess or chamber $q^6$ carrying depending L-shaped rivet check-levers $Q^2$ pivoted at their upper ends $q^7$ and coil springs $Q^3$ which bear against and normally hold the levers in such position that their lower ends, forming projecting feet $q^8$ having downwardly inclined upper marginal surfaces, are brought closely together under the outlet of the guide passage $q^4$ and intercept and prevent the discharge of the rivet therefrom until forced apart by the means hereinafter described.

The hopper P has a continuous oscillating motion imparted through a link $p^{15}$ (see Figs. 1 and 3) hinged to a lug $p^{25}$ fixed to the bottom $p^1$ and by its lower end to a rocking-lever $R^2$ fulcrumed at $a^3$ inside the column $A^1$ near its upper end; said lever being connected to and vibrated by a rod $P^3$ pivoted to a rocking-lever $P^4$ working on a bearing $p^{16}$ carried by bracket $a^4$ fixed to column $A^1$ and connected with and given motion by the cam-disk $X^3$ keyed to shaft E.

The plates $P^1$, $P^2$ are provided near their ends opposite the spring $p^{11}$ (see Figs. 4, 17, and 18) with slots $p^{17}$ $p^{21}$, respectively, through which passes a vertical arm $p^{18}$ hinged by its lower end to a bracket $r^6$ fixed to the said rocking-lever $R^2$; the said arm, near its upper end having one of its edges $p^{19}$ of tapering or angular conformation with its extreme end desirably of reduced width, substantially as shown; a vertical bar S pivotally attached by its lower end to an overhanging shoe $S^1$ carried by an arm $S^2$ hinged at $a^6$ to the column $A^1$, and having a flexible joint $s^1$ in its length, extends upwardly through a guide-bracket $a^5$ fixed to the column, to and through the slots $p^{17}$ $p^{21}$ of the plates $P^1$ $P^2$ being positioned adjacent to arm $p^{18}$ and having its rear edge $p^{22}$ near its extreme end tapered or downwardly inclined for a suitable distance. The shoe $S^1$ being positioned outside the circumferential line of movement described by the chucks and within the path of travel horizontally and radially of that portion of the bundle of broom-strands $S^3$ projecting outwardly from the chucks is engaged and lifted thereby, automatically moving the bar upward. As the bar is driven upwardly, its tapered edge $p^{22}$ which normally occupies position below the plate $P^1$ engages with the rear wall of slot $p^{17}$ of plate $P^1$ causing deflection of the bar forward so that its front edge $p^{24}$ is brought in contact with the rear edge of the arm $p^{18}$, for which while so held (see Fig. 18), it forms a stationary slide-bearing. As the arm $p^{18}$ is moved upwardly, its tapered edge $p^{19}$ is brought into engagement with the front wall of the slot $p^{21}$ of the slide-plate, forcing the plate forward as against the spring $p^{11}$ for such distance as brings its enlarged openings $p^{10}$ to point of register above the enlarged openings $p^7$ of the fixed plate $P^1$. The bar being at its downward normal position, with its narrowed portion $p^{23}$ alone remaining in the said slots, the hinged arm $p^{18}$ moving upwardly engages with the front wall of the slot $p^{21}$ as before described (see Fig. 19), but its necessary slide-bearing being out of operative position, and the spring opposing movement of the slide it is caused to be deflected rearward, pushing the bar S in the same direction.

Modifications of the devices which automatically control the delivery of the rivets to the chutes are illustrated in Figs. 21, 22, 23, 24, 25 and 26, the same consisting of means carried by each chuck arranged and adapted, through the agency of the bundle of broom-strands to engage with the lower end of bar S, and thereby move the same through its function of operating the slide-plate P² as described. In Figs. 21 and 24, I have shown a sliding-bolt S⁴ working through a suitable opening provided in the upper wall of the member F¹ having plates $s^3$ $s^4$ at its upper and lower ends, respectively, mainly intended to prevent its escape from the aperture. When the chuck is empty and closed, the bolt depends within the chuck area, with the plate $s^3$ seating in the recess $s^2$ formed on the upper outer face of the member with its extreme upper end $s^8$ below the horizontal plane occupied normally by the shoe $s^9$ carried by the lower end of the bar. When the chuck carries a bundle of broom-strands the bolt is manifestly forced upward thereby, with its lower plate $s^4$ seated within the recess $s^5$ in the under face of the member and its engaging end $s^8$ above the plane normally occupied by the shoe $s^9$, causing the bar to be driven upwardly, as the chuck is carried forward. In the views 22 and 23, the arm $p^{18}$ is shown to be dispensed with, the bar S having its inner edge $s^6$ near its upper end tapered after the manner of inclination $p^{19}$ given to said arm $p^{18}$, the edge $s^6$ being operative to perform the identical work of which said arm would be capable, if present. Sustaining brackets $a^{10}$, $a^{11}$ fixed to the column A¹ carry the bar, which is held to its downward position and retracted by a resistance spring $s^7$. Figs. 25 and 26 illustrate an irregularly shaped lever S⁵ pivoted within a recess $s^{10}$ provided in the upper chuck-member, arranged to project by its lower edge within the chuck area, desirably in that portion thereof which receives the shank-end $g^3$ of the head-forming plates. The lower end of the bar S carries a roller S⁶ which is guided through its vertical movements by an overhanging housing S⁷ fixed to the member F¹. Near its upper end the bar, passing through the slots of the fixed and sliding plates P¹ P² is provided with an inclined portion adapted to move snugly within the slot $p^{21}$, its front and rear edges $s^6$ $s^{11}$, respectively, having sliding contact with the front and rear walls of said slot, with the extreme end $p^{23}$ of the bar working in a guide bracket S⁸ attached to the fixed plate P¹. When the shank plate $g^3$ and the broom-strands are within the chuck, the lever $s^5$ being forced upwardly thereby, the moving chuck brings the upwardly inclined edge of the lever under the roller, gradually carrying the same upwardly until the apex of the incline is reached; the roller thence passing over the downward incline causing through the reciprocation of the bar, forward and endwise motion and retraction of the plate P². In employing the devices thus arranged and operative, (the same being positive in action) the springs $p^{11}$ and $s^7$ carried by the bar P² and S may be dispensed with; also the lever S⁵ may be located at any other point in connection with the chuck, whereby it will come in contact with the head-forming plate embracing the broom strands.

Means for opening the chucks by lifting the upper member F¹ following the riveting and unlocking functions of the apparatus, shown in Figs. 2, 4, 5 and 9, consists of an inclined guard W held by brackets $w$ $w^1$, fixed to the column A¹, operative within the circumferential and horizontal lines of travel of the chucks, to engage by its lower free-end with a recess $f^{20}$, formed in said member and to lift, hold and guide the same to a holding and closing guard I, likewise held by brackets $i$ to said column. The guard I supporting the uplifted member to the point predetermined for preliminary closure, following the introduction of the head-forming plates and broom-strands within the chuck, by its outwardly inclined end $i^1$ forces the member beyond its center of gravity, causing it to drop in position for passing under the devices which effect closure of the chucks for locking.

Means for automatically ejecting the broom from the chuck, following the lock-releasing and opening functions of the devices described, shown in Figs. 3, 4, and 5, consist of a vertically movable rod V held in upper and lower bracket bearings V¹, carried by the standard $d^2$ and operative to pass by its upper end through an opening $b^{33}$ provided in the table and a corresponding registering opening F⁴ provided in the lower chuck member F. A block V², fixed to the rod, is hinged to a link V⁴ pivotally connected to a rocking lever V³ fulcrumed on a bearing V⁵ carried by a bracket $d^{50}$ sustained by the standard $d^2$; the said lever having connection with and being operated by the cam-disk X carried by the cam-shaft E. The rod carries a coil-spring $v$ which impinges against the block V² and the lower bracket bearing V¹. The cam-slot in the disk X being regulated to vibrate and suddenly release the lever, the vibratory motion of the lever causes the rod to be drawn downwardly, compressing the spring; release of the lever permitting the rod, through the action of the spring, to be driven upwardly, its upper end passing through the openings described to and against the bottom of the broom—the movement of the rod being of such length and impact as insures the throwing of the broom from the chuck.

It is obvious that various changes may be made in the details of construction and arrangement herewith shown and described without deviating from the intent and scope of my invention. I therefore do not limit myself to such identical details, except as set forth in the appended claims.

In the machine illustrated herewith I have shown eight chucks carried by the rotary table (see Fig. 2) which for purposes of description I have numbered consecutively; the numerals being particularly intended to designate the various positions to which a single chuck is intermittingly, successively carried and held through one cycle of the table and the points or stations at which the several working devices perform their respective functions. Thus, for example 8 indicates the chuck positioned to receive the head-forming plates and a bundle of broom-strands.

The main shaft having continuous motion, imparts like motion through the gear connections described, to the cam-shaft, shank boring, drilling and spinning rotative devices. The controlling devices carried by the cam-shaft being necessarily accurately arranged and timed, the operation of the machine is as follows:—The disk Y engaging with and vibrating the lever $B^3$ causes the spring bolt carried at its upper end to be with-drawn from the peripheral index opening $b$ and thus release the table from locked position. Coincident with the release of the table, the cam-disk $X^1$ through the connecting arm $B^2$, pawl lever $B^1$ and projections $b^1$, moves the same forward; such motion being sufficient to carry the chuck, indicated as 1, already supplied with plates and broom-strands to the position indicated by 2—the upstanding member $F^1$ being thrown down by the guard I, at or about the initial movement of the table. As the chuck passing under the guiding or safety shoe H reaches the position indicated by 2 (see Fig. 1) locking of the table is effected by the spring pawl carried by the lever $B^3$; the cam-disk $X^5$ through its described connections therewith simultaneously causing the rod $H^1$ to move downwardly to contact with the upper member $F^1$ and to force the same to position at which it is caught and held by the locking pawl-levers $f^{11}$. Immediately thereafter, the cam-disk $X^4$, through the rocking-lever $j^3$, and other connections described, moves the rods J downward to operative engagement with the plate toe-bending sliding-blocks $f^9$ which are driven inwardly to their work. The rods $H^1$ and J being started on their retracting movement the table is again released, started and moved by the devices described to the next station indicated by 3, at which point it is held, while the cam disk $X^7$ through rocking-lever $K^2$, causes the drill-carrying head K to be moved upwardly to its work of providing openings through the broom-strands for the introduction of rivets,—and the cam-disk $X^6$ through rocking-lever $N^2$ and other described connections, causes the horizontally movable drill-carrying shaft N to move to its shank boring or cleaning work. As the several drilling devices are simultaneously withdrawn from their said described work, the table is again released and started forward; the bar S, which operates to control the action of the sliding-plate $P^2$ to normally prevent release, and at the proper juncture effect discharge of the rivets into the delivery chutes, being engaged directly by, or through the agency of the broom material carried by the moving chuck, and forced upward, causing endwise movement of the sliding-plate and therethrough the discharge of the proper number of rivets into the chutes through which they pass downward to the check-levers $Q^2$ working in the guideway Q. The chuck reaching the position indicated by 4, at which point the table is again stopped and held, the plunger-carrying head R, operated through the rocking-lever $R^2$ and other described connections by the cam-disk $X^3$, moves downwardly; the plungers entering the guide-passages $q^4$ and driving the rivets held by the check-levers from the guideways through the openings provided in the upper chuck member to their proper positions through the head-forming plates and the broom material; the sliding-head remaining at the limit of its downward travel, holding the plungers against the rivet heads until the rotating spindles carried upwardly by the sliding-head T to contact with the lower ends of the rivets complete their spinning or rivet setting work, the head T being given its reciprocating motion through the rocking-lever $T^3$ and other described connections by the cam-disk $X^2$. The table being released and again started in motion, the locking pawl-levers depending through the table from the lower chuck member are brought in contact with the fixed releasing blocks Z and thereby tripped from their locking engagement with the upper member; such tripping operation occurring while the chuck is being carried toward or when reaching the point indicated by 5 at which point in its travel the table is again released and starting in motion. As the chuck is carried toward the point indicated by 6, the freed upper-member is lifted to, or beyond a vertical position by the guard W, the completed broom being ejected from the chuck and machine, by the devices already sufficiently described, as the chuck reaches the said point 6. Through the succeeding intermitting movements of the table from the last described point to and from the stations indicated by 7 and 8 and until reaching the point designated by 1, the chuck is carried as an idler with its upper member uplifted and resting against the guard I, except that as heretofore described, when reaching the feeding point designated as 8 it, as well as each consecutively following chuck is supplied with head-forming plates and a bundle of broom strands thus permitting the production of eight brooms at each cycle of the table.

I claim as my invention and desire to secure by Letters Patent:—

1. In a continuously acting broom-making machine, in combination a rotative table carrying a multiplicity of material-receiving chucks; means for intermittingly moving and stopping the table; means for chuck closing and locking; drilling means which permit the introduction of rivets through the broom material; means for rivet carrying, discharge and delivery, means for rivet placing and setting; means for chuck unlocking and opening; and means for ejecting the broom from the chuck—all operating automatically and in succession, substantially as set forth.

2. In a continuously acting broom-making machine, in combination, a rotative table carrying a multiplicity of chucks, composed each of a fixed and movable member, arranged and adapted to receive head-forming plates and broom material; means for intermittingly actuating and stopping the table; means for effecting chuck closing and locking; drilling means for permitting the introduction of rivets through the broom material and head-forming plates; means for carrying and effecting rivet discharge and delivery; means for rivet placing and setting; means for releasing and lifting the movable chuck member; and means for ejecting the broom from the chuck; all operating automatically in succession, substantially as described.

3. In a continuously acting broom-making machine, in combination, a rotative table carrying a multiplicity of chucks composed each of a fixed and movable member, arranged and adapted to receive head-forming plates and broom material and to hold the same through the process of broom construction; means for closing and for locking the chuck members together; means for drilling through the broom material and for cleaning the handle-shank of the head-forming plates; means for rivet carrying, discharge, placing and setting; means for effecting release and lifting of the movable chuck member; and means for giving intermittent motion to the table whereby the chucks are successively carried from the closing devices to the mechanisms which respectively effect drilling, rivet placing and setting, chuck releasing and opening, and broom discharge, substantially as described.

4. In a continuously acting broom-making machine, in combination, a rotative table provided with material receiving chucks, composed, each of a lower fixed member and an upper member hinged thereto, the two members being provided with suitable openings for rivet introduction and setting; means for effecting chuck closing and locking; means for drilling; means for operating rivet carrying and discharging devices; means for rivet delivery, placing and setting; means for unlocking and raising the movable chuck member; and means for intermittingly operating the table, whereby the chucks are moved from the closing mechanism successively to the means respectively for drilling, rivet placing and setting, and chuck releasing and opening; substantially as described.

5. In a broom-making machine, in combination, a table, intermittingly rotative and carrying a multiplicity of material receiving chucks composed each of a fixed member, and a movable member provided with suitable openings for rivet insertion and setting; devices for effecting chuck closing and locking; a reciprocable head, carrying drills, operable through the table and one of the chuck members to provide openings through the broom material for rivet insertion; means for rivet carrying, discharge and delivery; means for chuck unlocking; and a multiplicity of cams, carried by a continuously driven shaft, connected with and controlling the intermittent action of the table and the operation successively of the chuck closing, the drilling and rivet placing and setting mechanisms; substantially as described.

6. In a broom-making machine, in combination, a table having intermittent rotative motion, carrying a multiplicity of chucks arranged and adapted to receive head-forming plates and broom material and to admit of the insertion and setting of rivets; a rivet carrying hopper or hoppers; devices intermittingly movable to control the discharge of rivets from the carrying devices; and means for actuating said discharge controlling devices located in the path of the broom materials carried by the chucks so as to be operated thereby, substantially as set forth.

7. In a broom-making machine, in combination, a two membered chuck, one member having hinged connection with the other in flexibly sustained journals which admit of swinging and parallel movements of the hinged member for opening and closing operation, locking pawl-levers carried by one member, means carried by or integrally forming part of the other member for locking engagement by the pawl-levers; and means for tripping said levers, substantially as described.

8. In a broom-making machine in combination, a two membered chuck adapted to receive sectional head forming plates and broom material, one member being fixed and the other member having movable connection therewith; guide pins and corresponding registering openings in the members respectively; fixed blocks carried by one member adapted to prevent the spreading of toes forming part of one plate section through the closing operation of the chuck; sliding blocks carried by the other member operable to bend toes forming part of the other plate section; and means for driving said blocks to their bending work; substantially as described.

9. In a broom-making machine, in combination, a rotatable table carrying a multiplicity of broom material-receiving chucks, provided on its under face with equi-spaced projections and in its periphery with index openings or depressions; a pivoted lever having a yielding pawl at its free end for engagement with said projections and thereby intermittingly carrying the table forward; a lever carrying at one end a spring bolt adapted to engage the index openings or depressions and thereby hold the same in the positions to which it is successively carried; a cam projection carried by the other end of the lever; a rotative cam adapted to engage with the lever cam projection and thereby trip the lever to withdraw the spring-bolt from engagement with the table; and means for actuating the table moving lever, substantially as described.

10. In a broom-making machine in combination, a rotatable table carrying a multiplicity of chucks, each having a member movable for the introduction of broom materials; means for locking the chuck members together; means for intermittingly moving and stopping the table; and a fixedly sustained guard arranged and adapted to engage with and lift the movable member, substantially as described.

11. In a broom-making machine, in combination, a rotatable table carrying a multiplicity of chucks, each having a member movable for the introduction of broom materials; means for intermittingly moving and stopping the table; a fixedly sustained guard adapted to engage with and lift the movable member and a fixedly held guard adapted to guide the movable member to a predetermined point in the travel of the table and to drop the same; substantially as described.

12. In a broom-making machine, in combination, a movable table carrying a multiplicity of broom material-carrying chucks, each having a member fixed to the table and a movable member; means for giving intermitting motion to, stopping the movement of and holding the table; means for raising the movable chuck-member; and means for automatically ejecting the broom from the chuck; substantially as described.

13. In a broom-making machine, in combination, a rotatable table carrying a multiplicity of chucks, each having a member movable for the introduction of broom materials; means for locking the chuck members together; means for giving intermitting motion to, stopping the movement of and holding the table; a reciprocably actuated rod, adapted to be brought in contact with the upper chuck member, to force the same to locking position and to be retracted therefrom preliminary to motion of the table which carries the chuck forward successively to drilling and other devices forming part of the apparatus; substantially as described.

14. In a broom-making machine, in combination a rotatable table carrying a multiplicity of chucks, each having a member movable for the introduction of broom material; means for giving intermitting motion to the table; a reciprocable rod for effecting by engagement therewith closure and locking engagement of the chuck members; a shoe carried by the engaging end of the rod having a curved conformation in the direction of approach of the chuck adapted to guide the partly opened chuck to position for closure and locking; substantially as described.

15. In a broom-making machine, in combination, a rotatable table carrying a multiplicity of material-receiving chucks, each having a movable member; means for giving intermitting motion to the table; means for effecting closure and locking of the chuck members; and an adjustable standard disposed beneath and in working contact with the table in operative alinement with the chuck closing mechanisms, adapted to hold the table against the thrust of the chuck closing rod; substantially as described.

In testimony whereof, I have signed my name to this specification in the presence of two witnesses.

GEORGE W. MANNING.

Witnesses:
W. W. SMITT,
INEZ A. GIRARD.

---

Copies of this patent may be obtained for five cents each, by addressing the "Commissioner of Patents, Washington, D. C."